United States Patent Office 3,310,683
Patented Mar. 21, 1967

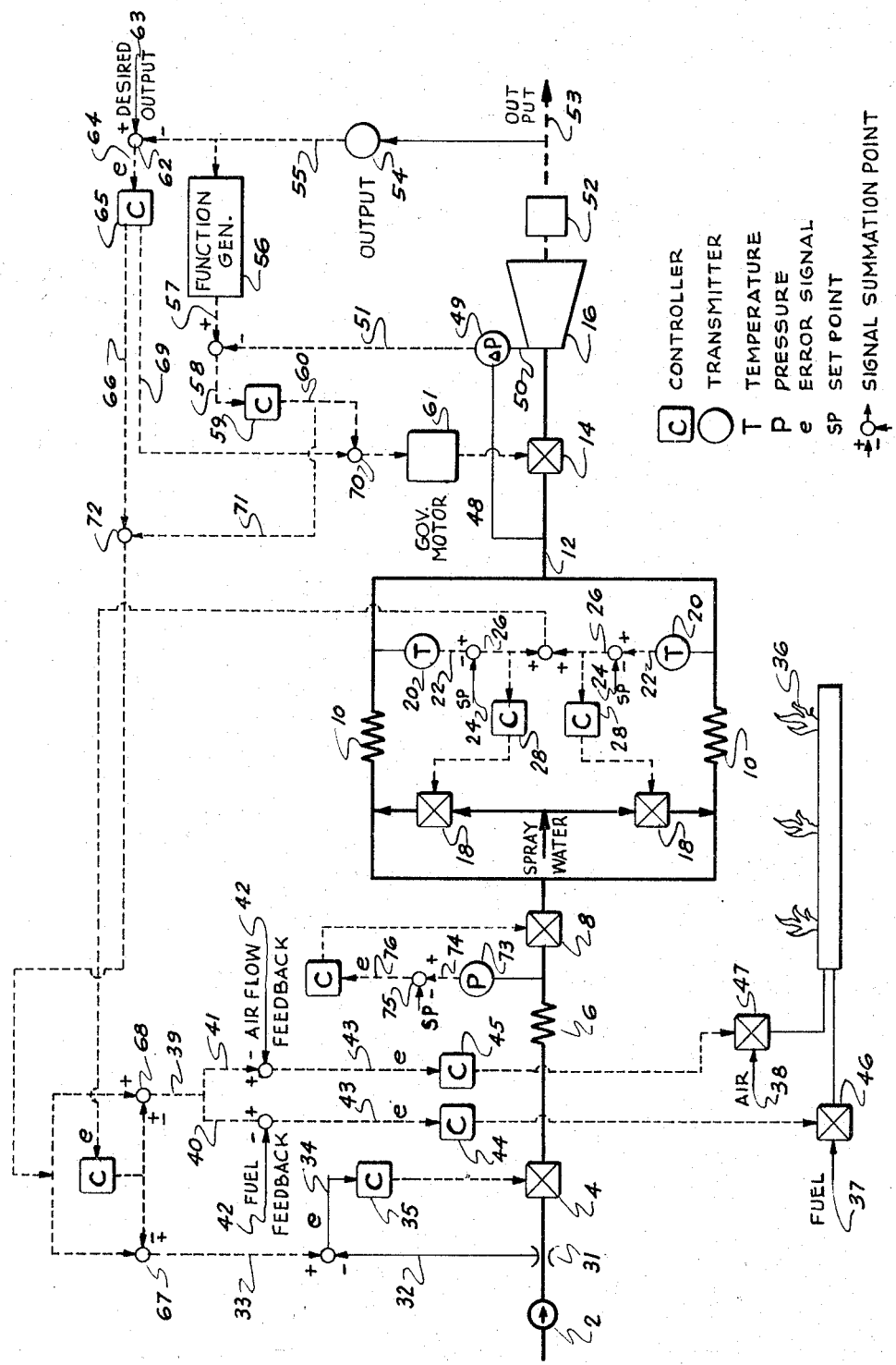

3,310,683
STEAM GENERATOR AND TURBINE
CONTROL SYSTEM
Richard D. Hottenstine, Windsor, Conn., assignor to Combustion Engineering, Inc., Windsor, Conn., a corporation of Delaware
Filed Sept. 3, 1964, Ser. No. 394,291
5 Claims. (Cl. 290—2)

This case relates to control systems for vapor generators and in particular to a system which provides a more rapid response during load transients while operating the vapor generator under variable pressure operation.

In modern-day electric plants there is considerable need for rapid response of the generating units during load transients. This may come about because of a need to pick up load occasioned by the loss of other units operating on the system, or it may be occasioned by the use of the particular unit for the regulation of frequency in this system. In such an operation this unit effectively absorbs all the transient loadings of the system.

The ability of the units to absorb these transients rapidly has been somewhat limited due to the large size of modern units. Although the modern unit, being more efficient, normally is based loaded at near maximum load, it is required occasionally now, and certainly in the future, to operate under considerable fluctuating load conditions.

In order to increase the efficiency of modern-day plants, many are now operating as variable pressure plants. Conventionally the vapor generator has operated at full design pressure throughout the entire load range with the generator load being controlled by regulating the turbine throttle valve so that the steam turbine takes the amount of steam required to generate the desired load. For a particular load there is a definite pressure required immediately upstream of the turbine which is essentially dictated by the pressure drop through the turbine to the condenser. The difference between this required pressure and the full steam generator pressure is throttled by the turbine throttle valve. In variable pressure operation the turbine throttle valve is left in a fixed position, normally wide open, and the pressure in the steam generator is varied to obtained the desired load from the generator. Under such operation load is increased by increasing the fuel and feedwater input to the steam generator, thereby increasing its output and the generation of the turbo generator.

While operating such a system it is difficult to obtain a rapid response of the generator since considerable heat and water must be stored in the generator during such a transient. This is due to the fact that different temperatures and densities exist throughout the vapor generator at each of the two loads being considered and the control system is required to put in enough heat and water to satisfy the storage requirement as well as that required to increase the output. Obviously under such a condition the response of the steam generator and the turbo generator combination to a load change is sluggish.

In my invention improved response is obtained by operating during variable pressure operation with the turbine throttle valve operating to hold a preselected pressure drop across it. During such operation the pressure in the vapor generator is increased by this preselected amount above that required to drive the turbine under the particular load. The excess pressure provides a storage of heat and steam which may be used to increase the response during a load transient. The preselected pressure drop may be varied with load so that the capability of the unit to respond rapidly at various loads may be varied as desired.

It is an object of my invention to provide an improved control response of a vapor generator during load transients.

It is a further object to provide a means wherein heat and water storage in a vapor generator may be held so that they will be available to aid in transient response to a load increase.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of the illustrative embodiment, said embodiment being shown by the accompanying drawing wherein the figure is a schematic diagram of a once-through vapor generator driving a steam turbine-electric generator combination embodying my invention for improved control response.

Feedwater pump 2 supplies the feedwater through feedwater valve 4 to the primary fluid heating section 6. The water then after passing through the boiler throttle valve 8 is split into two paths passing through the fluid superheating surfaces 10. These two circuits are joined with the fluid passing through the steam line 12 and subsequently the turbine throttle valve 14 and the steam turbine 16. From the steam turbine the steam is passed through reheaters and subsequent turbine (not shown) and condensed in a condenser (not shown) from which it is returned to the feed pump 2.

Temperature control of the steam leaving the fluid superheating surfaces 10 is effected by the introduction of spray water through the desuperheating valves 18 immediately upstream of the fluid superheating surfaces. The steam temperature is sensed downstream of the superheating surfaces by means of a thermocouple or other such device in response to which temperature the transmitter 20 sends out a control signal 22. The set point 24 establishes a desired steam temperature by emitting a control signal which is compared to the control signal 22 establishing error signal 26. This signal operates through controller 28 to operate the spray water injection valve 18 thereby regulating the temperature of the steam.

The error signals 26 are added and a control signal 30 is established which operates to regulate the feedwater and fuel input to also correct temperature variations which exist.

The feedwater control system includes the feedwater flow nozzle 31 from which a control signal 32 is produced. This signal is compared with a desired feedwater flow control signal 33 generating an error signal 34 which operates through the feedwater controller 35 to operate the feedwater valve 4.

The heat input to the vapor generator is represented by the flames 36 which result from the input of fuel 37 and air 38. The signal 39 representative of the desired heat input is established which is split into a fuel signal 40 and an air signal 41. These signals are compared to feed back, or actual condition, signals 42 which are compared to the desired signal to establish an error signal 43. These error signals operate through the fuel controller 44 and the air controller 45 to operate the fuel regulator 46 and the air regulator 47. Thus the desired heat input signal 39 regulates both the fuel and air input to control the steam generator flame 36.

Pressure sensing line 48 is connected to the steam line 12 upstream of the turbine throttle valve 14 so that this upstream pressure is sensed by the pressure difference transmitter 49. Steam pressure sensing line 50 is connected downstream of the turbine throttle valve 14 so that the downstream pressure is sensed by the transmitter 49 which then emits a control signal 51 which is representative of the difference in pressure sensed through lines 48 and 50. This pressure difference should be ideally the pressure difference across the throttle valve alone, however practical considerations make such an ideal result difficult to obtain. The connection between the turbine throttle valve 14 and the turbine 16 is normally very short and a highly turbulent passage so that reasonable pressure measurements cannot be obtained. Therefore I have illustrated the pressure tap as located in the first stage of the turbine immediately downstream of the nozzles and first stage blading. Although this incorporates in the measurement a certain amount of pressure drop which is not due to the turbine throttle valve, its magnitude is sufficiently small as compared with the throttle valve drop that it may be adequately precalculated and allowance made for this correction in establishing a desired pressure difference to be held.

The turbine is connected so that it drives the generator 52 which is connected to an electrical load and generates power indicated as output 53. This output has a particular power value as measured in megawatts and a particular frequency. Each of these figures is considered as a portion of the output and when we consider an error in the output it may be either a megawatt error or a frequency error.

Generation transmitter 54 senses the generator output and establishes as a function of such output the generation output control signal 55. This control signal is sent to a function generator 56 which establishes as a function of the generator output a control signal 57 which is representative of the desired pressure difference to be held across the turbine throttle valve. This control signal is compared to the actual pressure difference signal 51 with an error signal 58 thus formed. This error signal is modified in controller 59 with the modified signal 60 operating on the governor motor 61 to regulate the turbine throttle valve 14.

Thus as a function of the measured generator output a desired pressure difference across the turbine throttle valve is established. The actual pressure drop across this valve is measured, compared to the desired pressure difference and as a result of this comparison the turbine throttle valve is moved in the direction such as to modify the measured pressure drop to be the same as the desired pressure drop. This permits the desired pressure drop to be held acoss the turbine throttle valve on any basis desired, so that during load transients the turbine throttle valve may be rapidly opened taking advantage of the steam stored upstream of the turbine throttle valve. This is significant during a load increase since during a load decrease the turbine throttle valve could be closed down at any time regardless of whether my invention were used or not. During a load increase however the storage must have been previously held in the steam generator in order that we may take advantage of it during the transients.

At signal summation point 62 the desired output signal 63 is compared with the actual output signal 55. Any difference in these two signals results in a generation error signal 64. This signal is modified in controller 65 and the control signal 66 representing the generation error operates through signal summation point 67 to establish a change in feedwater flow and through signal summation point 68 to establish a change in fuel and air flow. Thus the supply of feedwater, fuel and air to the steam generator is corrected to bring the actual output in accord with the desired output. As previously described however there is a considerable time lag involved since the inputs to the vapor generator must supply storage in the nature of water stored at a higher pressure and heat stored in the metal and slag of the steam generator.

In order to increase the response of this unit so that the actual output may be more rapidly brought in line with the desired output, the controller 65 also sends a signal 69 representing generation error to summation point 70 where it is added to the modified pressure difference error signal 60 and operates the governor motor to move the turbine throttle valve 14. This acts in accordance with the needs of the unit immediately decreasing the steam flow to the turbine during a load decrease, or taking steam from storage to immediately increase the steam flow during a load increase. Therefore while the loop 59 has been operating the turbine throttle valve 14 to maintain a preselected pressure drop across this valve during steady state operation, the controller 65 is operative during a transient to open the valve 14, reducing the pressure drop across that valve, thereby taking advantage of storage in the steam generator to carry the increased load during the time it takes the feedwater, fuel and air to pick up and establish the new condition within the boiler.

As previously described controller 59 emits a control signal 60 which is representative of any change which may be required in the turbine throttle valve position in order to maintain the preselected pressure drop. If the turbine throttle valve must be moved to obtain desired pressure drop, the changed valve position will require a change in the feedwater, fuel and air flow to the steam generator in order to compensate for the changed resistance in the steam line. Therefore a branch of control signal 60 is sent, shown as control signal 71, to set point 72 where it is added to the output error signal 66 and operates through summation points 67 and 68 to correct feedwater and fuel flows respectively. This control signal 71 is not essential to the operation of the unit but does offer some improvement in the smoothness of operation.

The boiler throttle valve 8 is operated to control a preselected pressure upstream in the fluid heating section 6. In the case of supercritical pressure steam generators this prevents the reduction of pressure to such an extent that a two-phase fluid occurs in the fluid heating section while in the case of subcritical units this results in an increased pressure which results in an improved stability condition within the parallel tubes of the heating section. Pressure transmitter 73 senses this pressure and establishes control signal 74 which is representative thereof. This is compared with the set point signal 75 which represents the desired pressure upstream of the boiler throttle valve 8 yielding pressure error signal 76 which operates through controller 77 to modify the position of the boiler throttle valve 8 so that the pressure upstream thereof may be controlled at its desired value.

My invention may also be applied to a drum type subcritical unit. Obvious modifications of the control scheme as illustrated in my diagram must of course be made since steam temperature in such a unit is not controlled by feedwater flow. In such a unit the control signal 30 must therefore be eliminated. The same type control system may be used however insofar as it affects the operation of the turbine throttle valve.

It should be noted that both control signal 60 and control signal 69 are operating to dictate a position of turbine throttle valve 14. The signal 60 tries to maintain the preselected pressure drop across the throttle valve while the control signal 69 operates to move the valve during transient operation so that advantage may be taken of the storage in the vapor generator which has been established by the operation of control signal 60. Controller 59 which emits signal 60 should therefore have a relatively high integrating action and a relatively low proportional action so that the turbine throttle valve will be slowly returned to a position holding the preselected pressure drop. Controller 65 which emits signal 69 on the other hand should have a relatively low integrating action with a relatively high proportional action so that the turbine throttle valve will immediately respond to generation error. This occurs since the high proportional action of the error signal will override the pressure drop signal during the transient, while during long run the low integrating action of the error signal 69 will permit it to be overcome by the highly integrated signal 60. Thus during a load transient the control signal 60 will not immediately wash out the effect of the generation error signal 69.

The control system of my invention may be either electrical in nature, hydraulic, or may employ air pressure. An electric system is preferred because of its convenience, and the controllers indicated may be either controllers of the type manufactured by Leeds and Northrup Company, the Hagan Company, or others which manufacture integrating type controllers. These controllers will supply proportional action in which case the signal emitted is in some manner proportional to the signal received and they can also provide integrated signals wherein the emitted signal increases in strength in some proportion with the time during which the received signal has varied from the desired value. The temperature pressure and flow transmitters may be of the standard Leeds and Northrup Company or Hagan Company type with these transmitters transmitting a signal that is compatible with the controller inputs.

While I have illustrated and described the preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A method of operating a vapor generator-turbo electric generator combination including a turbine throttle valve comprising regulating the turbine throttle valve to maintain a preselected pressure drop across said valve while regulating input to the vapor generator for electric generation; correcting transient electric generation error by overridingly regulating the turbine throttle valve and simultaneously correcting the vapor generator input; and subsequently adjusting the throttle valve to maintain a preselected pressure drop across said valve while regulating the vapor generator input for electric generation.

2. A method of operating a once-through vapor generator-turbo electric generator combination including a turbine throttle valve comprising regulating the turbine throttle valve to maintain a preselected pressure drop across said valve while regulating the fuel and feedwater flow to the vapor generator for generation of a first electric load; correcting a transient electric generation error by overridingly regulating the turbine throttle valve and simultaneously correcting feedwater and fuel flow; and subsequently adjusting the throttle valve to maintain a preselected pressure drop across said valve while regulating the fuel and feedwater flow to the vapor generator for generation of a second electric load.

3. An apparatus for generating electricity comprising an electric generator; a steam turbine driving said generator; and a vapor generator supplying said turbine; said vapor generator having means for supplying the primary fluid, means for supplying fuel and air, a primary fluid heating section, a primary fluid superheating section, primary fluid throttling means located intermediate said primary fluid heating and superheating sections; a steam line connecting sid vapor generator and turbine with said vapor turbine throttle valve located in said steam line; means for sensing the pressure difference across said turbine throttle valve; means for sensing the output of said generator; means for determining a desired pressure difference across the turbine throttle valve as a function of the generator output; means for comparing the desired pressure difference with the actual pressure difference; means for regulating the turbine throttle valve to obtain the desired pressure difference; means for determining the difference between the actual generator output and the desired generator output and means for regulating the turbine throttle valve as a function of this difference between actual and desired output.

4. An apparatus for generating electricity comprising an electric generator; a steam turbine driving said generator; and a vapor generator supplying said turbine, said vapor generator having means for supplying the primary fluid, means for supplying fuel and air, a primary fluid heating section, a primary fluid superheating section, a steam line connecting said vapor generator; means for sensing the pressure difference across said turbine throttle valve; means for sensing the output of said generator; means for determining a desired pressure difference across the turbine throttle valve as a function of the generator output; means for comparing the desired pressure difference with the actual pressure difference; means for regulating the turbine throttle valve to obtain the desired pressure difference; means for determining the difference between the actual generator output and the desired generator output and means for regulating the turbine throttle valve as a function of this difference between actual and desired output.

5. In a once-through flow steam generator operating at supercritical pressure and having a steam generating portion, a steam heating portion, first flow controlling means for controlling the flow from said steam generating portion to said steam heating portion, a turbine generator organized to receive steam from said steam generator for generating alternating current of a predetermined desired frequency and second flow controlling means for controlling the flow from said steam heating portion to said turbine generator, the method of controlling the electric load delivered by said turbine generator comprising the steps of:

(1) receiving impulses reflecting variations in electric load quantity;

(2) in response to said impulses, regulating said first and said second flow control means so as to obtain a sum total pressure drop through said first and second flow control means which results in a pressure at the turbine generator inlet producing the desired electric load; and (3) proportioning said sum total pressure drop between said first and said second flow control means such as to maintain for any given electric load a predetermined relationship between said electric load and said second pressure drop.

References Cited by the Examiner

UNITED STATES PATENTS

| | | | |
|---|---|---|---|
| 2,482,791 | 9/1949 | Nettle et al. | |
| 2,681,418 | 9/1954 | Bristol | 290—2 |
| 2,861,194 | 11/1958 | Bristol | 290—2 |
| 2,895,056 | 7/1959 | Bristol | 290—2 |
| 2,982,864 | 5/1961 | Furreboe | 290—2 |
| 3,109,102 | 10/1963 | Jenkins | 290—2 |

References Cited by the Applicant

"Transient Loading Improvements for Large Steam Generating Units," ASME 60 WA–51, by Charles Strohmyer, Jr.

"Large Sub and Supercritical Steam Generator Startup and Control System Integration With Turbine Generator," American Power Conference of March 1962.

ORIS L. RADER, *Primary Examiner.*

G. SIMMONS, *Assistant Examiner.*